Patented Dec. 23, 1924.

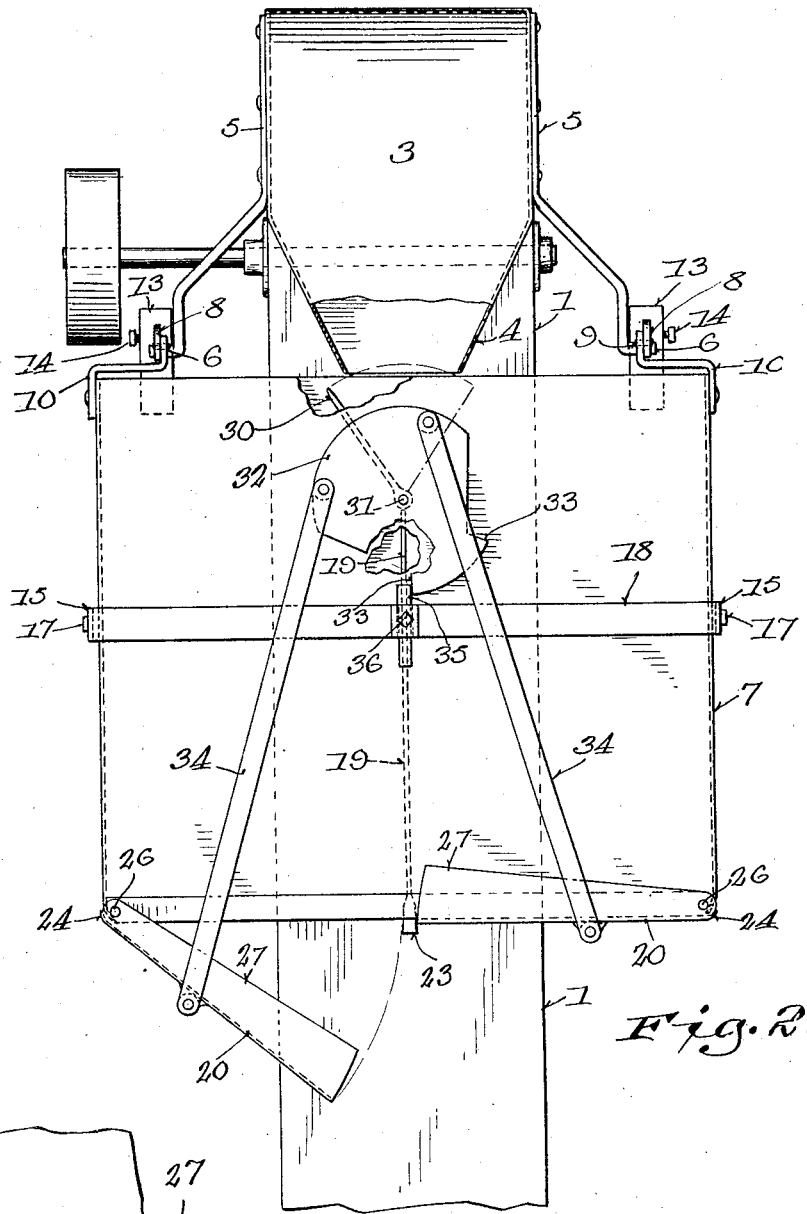
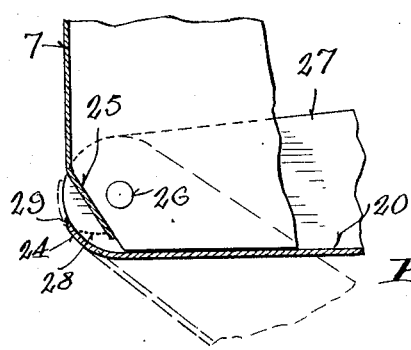
Fig. 2.
Fig. 3.

1,520,470

UNITED STATES PATENT OFFICE.

JOHN C. HEINEKE, OF SPRINGFIELD, ILLINOIS.

GRAIN-WEIGHING ATTACHMENT FOR THRASHING MACHINES.

Application filed July 9, 1921. Serial No. 483,474.

*To all whom it may concern:*

Be it known that I, JOHN C. HEINEKE, a citizen of the United States, residing at Springfield, county of Sangamon, and State of Illinois, have invented new and useful Improvements in Grain-Weighing Attachments for Thrashing Machines, of which the following is a specification.

This invention relates to grain weighing attachments for thrashing machines, and is particularly directed to an attachment adapted to receive the grain from the elevator and automatically weigh the same.

Objects of this invention are to provide a device adapted to be combined with the elevator of a thrashing machine in such a manner that it automatically receives and accurately weighs the grain as it is delivered from the conveyor; to provide such a device so organized that it may be wholly supported from the conveyor without requiring additional platforms or supports; and to provide such a device adapted for intermittent delivery of successive quantities of the weighed grain.

Further objects are to provide a grain weighing device in which a hopper is pivotally suspended from the spout of the elevator; in which a plurality of brackets extend outwardly from the sides of the spout of the elevator and support the hopper and form fulcrum points for the weighing levers; and to provide such a grain weighing device so organized that the grain may be continuously delivered into the hopper, and that the weighed and unweighed portions will be positively separated.

Further objects are to provide a grain weighing attachment for thrashing machines in which a valve is pivotally mounted wholly beneath the discharge spout so as to prevent clogging of the spout, and to aid in preventing the valve from stopping on dead center; and to provide pivotally mounted outlet valves adjacent the lower end of the hopper so connected with the hopper that seepage of the grain outwardly from the valves is prevented, as well as clogging of the pivoted end of the valve with resulting wedging.

An embodiment of the invention is shown in the accompanying drawings, in which:

Fig. 2 is an elevation taken on a plane at right angles to Fig. 1, with parts broken away to more clearly illustrate the construction.

Fig. 3 is a fragmentary detail of the joint between the bottom or outlet valves and the hopper.

Figure 1:
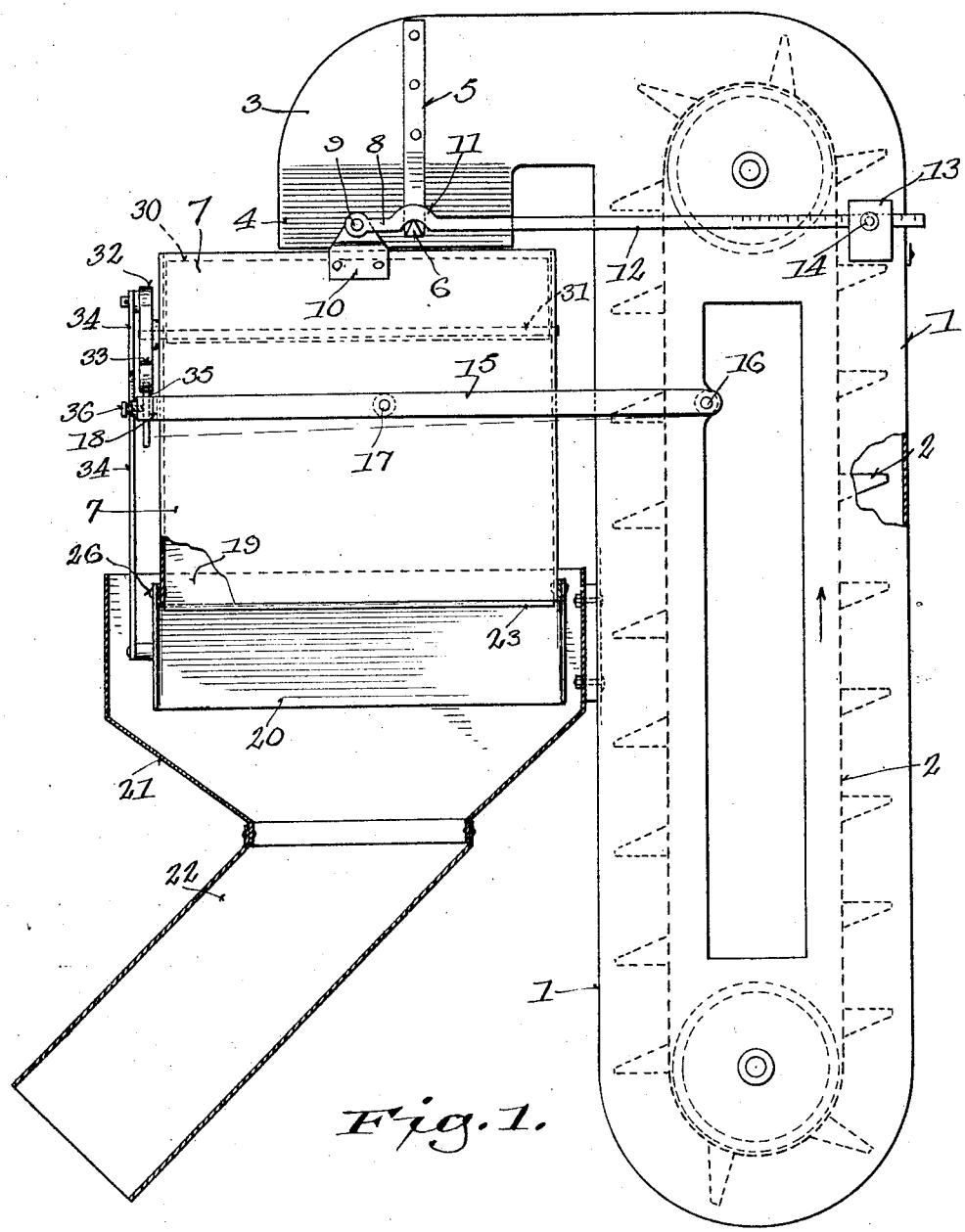
Fig. 1 is a vertical elevation, partly in section, of an elevator for a grain thrasher with the weighing device attached thereto.

In the drawings, 1 represents the casing which has the usual high speed elevator attached to thrashing machines. This elevator has an outwardly extending elbowed portion 3, terminating in a constricted spout 4. Adjacent this elbowed portion a pair of reenforcing strips or brackets 5 are provided upon opposite sides thereof, such strips terminating in beam points or fulcrums 6 which extend laterally from the reenforcing strips.

A weighing hopper 7 is positioned beneath the spout 4, and is carried by scale beams 8 by means of the pivotal connection 9 between such beams and brackets 10 attached to the hopper. These scale beams are bowed upwardly adjacent the fulcrum points 6 and rest upon such points, thereby providing a relatively short lever arm between the connection 9 and the point 6. They extend rearwardly upon opposite sides of the conveyor casing, and their long arms 12 are each provided with an adjustably positioned weighing weight 13 which may be locked in any one of a plurality of positions by means of the thumb screw 14. The hopper 7 is further swingingly joined to the casing 1 by means of the levers 15 which are positioned upon opposite sides of both the hopper and the casing. These levers are pivoted at 16 to the casing and at 17 to the hopper. They are joined across the front of the hopper by means of the strap or band 18.

The hopper is divided into a pair of interior compartments by means of a central partition 19 and each compartment is closed by means of pivotally supported bottom valves or doors 20. The motion of these valves is controlled by mechanism to be hereinafter described.

The valves 20 are positioned outside of the lower portion 7 and cooperate, adjacent their inner edges with a downwardly extending slightly enlarged continuation 23 of the partition 10 to thereby prevent grain from passing downwardly from the hopper when such valves are closed. Their outer ends are each provided with an upwardly extending rounded portion 24 which overlaps, and is slightly spaced from, an interiorly directed portion 25 of the side walls of the casing, Fig. 3 showing such construction in enlarged detail. The full line position in Fig. 3 shows a valve 20 in closed position and the dotted line indicates it in open position. It is to be noted that the pivotal connection between the valves and the side walls of the hopper comprises aligned studs 26 which pass outwardly from the side walls of the hopper and through an appropriate opening in the side walls 27 of the valves 20. This construction provides an unobstructed space across the interior of the hopper and aids in preventing clogging or wedging. The downwardly projecting and inwardly directed portions 25 of the side walls of the hopper direct the grain towards the inner portion of the hopper. Some grain will, however, rise as indicated in dotted lines at 28 in Fig. 3 but such grain will not rise above the upper edge 29 of the curved portion 28 of the valve. It is to be noted that when the valve is in its open position that the opening between the member 25 and the valve is materially increased as may be seen from the dotted line position of the valve, Fig. 3. It will be seen that this provides a free downward passage for any grain that has accumulated between the member 25 and the portion 28 of the valve.

The grain, it is understood, is delivered into the hopper by means of the elevator, is weighed and thereafter discharged from the bottom portion of the hopper. A funnel-shaped member 21 surrounds the lower portion of the hopper and is spaced therefrom a suitable distance to allow the hopper to freely reciprocate within the upper portion of such member. This funnel-shaped member receives the grain and directs it into a downwardly and outwardly extending chute 22. The weighed grain may, therefore, be received in bags or other suitable receptacles from the outwardly extending chute 22.

Within the hopper immediately below the constricted portion 4 of the spout is mounted a deflecting valve 30. This valve is pivoted to a shaft 31 adjacent the upper edge of the partition 19 and forms in effect a continuation of such partition completely across the interior of the hopper. It is to be noted from an inspection of Fig. 2 that the valve 30 swings just clear of the lower edge of the spout of contracted portion 4. The shaft 31 extends outwardly through one side of the casing and has attached thereto a plate 32, such plate being provided with cut out portions forming shoulders 33 at spaced points adjacent its lower edge. A pair of links 34 connects the bottom valves 20 with this disk so that when the valve 30 swings to one side the corresponding bottom valve 20 is open and the other valve 20 is closed. The disk 32 is normally prevented from rotating by means of a stop 35 adjustably secured by means of a set screw 36 to the transverse strap or bar 18 extending across the front of the hopper.

The operation of the device is as follows: The grain from the thrashing machine is delivered to the lower portion of the elevator and is raised on the ascending side of such elevator, the direction of travel being indicated by the arrow in Fig. 1. The grain adjacent the upper end of the elevator is thrown outwardly by centrifugal force due to the rapid rotation of the elevator and is guided by the elbowed portion 3 into the spout and flows from the constricted portion into the hopper. It is to be noted that as the compartment receiving the grain gradually fills that the major portion of the weight of the grain is carried by the corresponding bottom valve or door 20. When the weight reaches such a point that the hopper descends against the action of the weights 13, the point 17 is moved downwardly thereby causing the stop 35 to move downwardly at somewhere near twice the speed of downward travel of the hopper, thereby causing relative motion to occur between the stop 35 and the hopper. When the stop 35 moves out of the path of the shoulder 33 the weight of the grain upon the bottom door acting through the link 34 causes the disk 32 to rotate in such a manner as to open the valve 20 of the filled compartment and to close the valve 20 of the other compartment. At the same time, the valve 30 swings into the dotted line position shown in Fig. 2 and deflects the grain into the empty compartment. As the grain is discharged from the filled compartment into the funnel-shaped portion 21 and into the chute 22 the weights 13 cause the hopper to rise thereby moving the stop 35 into the path of the shoulder 33 to thereby lock the valve 30 in its new position. When the second compartment fills to such an extent as to overcome the action of the weights 13 the process is repeated. It will thus be seen that the device automatically functions to discharge intermittently amounts of grain corresponding to predetermined weights. It is obvious that the settings of the weights 13 may be varied to thereby vary the point at which the hopper will descend and correspondingly vary the amount of the discharged grain.

It will thus be seen that a weighing device has been provided for thrashing machines in which predetermined weights of grain are intermittently discharged. It will also be seen that a free and unobstructed passage has been provided for the grain and that clogging will not result.

It is to be noted that the entire device is suspended or supported from the elevator and that additional stands or supports are therefore not required.

I claim:

1. A grain weighing attachment for thrashing machines combining a grain receiving hopper divided interiorly into compartments having openings in their bottom portions, a pivoted central beam counterbalanced to support said hopper, outlet valves controlling grain delivery through said openings and interconnected to be alternatively closed and opened, a deflecting valve controlling the admission of grain to said compartments and interconnected with said first mentioned valves to deflect grain to the compartment of which the delivery opening is closed, a latch for securing said valves in either of their alternative positions, a trip operable to release said latch and permit the weight of grain upon an outlet valve to throw said interconnected outlet and deflecting valves to their alternative positions, and a trip operating lever having a fixed pivot adjacent one of its ends, and an intermediate pivot upon said hopper, the free end of said lever being connected with said trip for the actuation thereof.

2. A grain weighing attachment for thrashing machines combining a hopper interiorly divided into compartments having an outlet in its lower portion, a valve controlling each outlet, said valves being interconnected to be alternatively in closed and open position, a deflecting valve interconnected with said outlet valves and pivoted to assume an inclined position adapted to deflect incoming grain into that compartment in which the outlet valve is closed, a latch element provided with a pair of opposed shoulders, a trip engageable with one of said shoulders in each of the alternative positions of said valves and vertically movable into shoulder engaging and shoulder releasing position, and a trip lever encircling said hopper and provided at its extremities with fixed pivot points, intermediate portions of said lever being pivoted to the hopper and said trip being associated with the free end of said lever.

3. A grain weighing attachment for thrashing machines comprising a movably mounted hopper, a pivoted scale beam arranged to support said hopper, an interior partition dividing said hopper into two laterally arranged compartments, each provided with a discharge opening in its bottom, pivotally mounted outlet valves, a pivotally mounted deflecting valve associated with said partition and movable about said pivot to direct incoming grain into the compartment of which the outlet valve is in its closed position, a pivoted latch plate connected for movement with said deflecting valve, said latch plate being provided with opposed shoulders, links pivoted to said latch plate at points laterally removed from the pivot thereof and pivoted also to said outlet valves, interconnecting said outlet valves and deflecting valve, a trip engageable and disengageable with said shoulders, and actuating mechanism responsive to a downward movement of said hopper for moving said trip to shoulder disengaging position.

4. A grain weighing attachment for thrashing machines comprising a movably mounted hopper internally divided into compartments and provided with discharge openings in the bottom portions of each compartment, a pivoted beam for supporting said hopper, a pivoted deflecting valve for controlling the admission of grain to the compartments in said hopper, a latch element connected to said valve and disposed exteriorly to said hopper for pivotal movement with said valve, outlet valves controlling the delivery of grain from each compartment through said openings and linked to said latch element, a counterpart latch element vertically movable to and from engagement with said first named latch element, and a lever supporting said counterpart latch element at its free end, pivoted intermediate its ends to said hopper, and provided beyond said intermediate pivot with a fixed pivot.

5. The combination with the delivery spout of a grain elevator, of a counterweighted vertically movable weighing hopper having a plurality of compartments, an outlet valve for each compartment, means for opening and closing the outlet valves in alternation, trip mechanism adapted to automatically lock the valves alternately in open and closed position, and motion amplifying means for utilizing a downward movement of the hopper to release the trip mechanism, and allow the weight of the grain on the closed valve to reverse the position of the valves.

6. A grain weighing attachment combining a fulcrumed scale beam, a hopper suspended therefrom and divided interiorly into compartments, each provided with a discharge opening in its bottom, a deflecting valve divided within said hopper and arranged to deflect incoming grain into one of said compartments, a pivoted latch element associated with said deflecting valve and mounted exteriorly to said hopper for movement with said valve, discharge valves pivoted to said hopper at their outer margins and linked to said latch element to be alternatively in closed and open positions, a counterpart latch element movable vertically to and from engagement with said first mentioned latch element and adapted when engaged therewith to maintain said valves fixed in either of their alternative positions, and an operating lever for said counterpart clutch element associated with said element provided with a fixed pivot and provided with an intermediate pivotal connection with said hopper, said lever being adapted to operate said latch element to release said valves responsive to a downward movement of said hopper under the weight of grain therein.

JOHN C. HEINEKE.